United States Patent
DeMartino

[11] Patent Number: 5,833,249
[45] Date of Patent: Nov. 10, 1998

[54] STAIR CLIMBING HAND TRUCK

[76] Inventor: Dominick DeMartino, 904 Mill Pond Dr., South Windsor, Conn. 06074

[21] Appl. No.: 675,091

[22] Filed: Jul. 3, 1996

[51] Int. Cl.[6] .................................................. B62B 1/04
[52] U.S. Cl. ..................... 280/5.2; 280/5.24; 280/47.27
[58] Field of Search ................................ 280/5.2, 5.24, 280/47.131, 47.17, 47.19, 47.27, 5.22

[56] References Cited

U.S. PATENT DOCUMENTS

| | | | |
|---|---|---|---|
| 1,807,913 | 6/1931 | Hollowood | 280/47.27 |
| 2,700,573 | 1/1955 | Nordgard | 280/47.27 |
| 2,747,883 | 5/1956 | Frost | 280/47.27 |
| 2,770,310 | 11/1956 | Gates | 280/47.27 |
| 3,055,523 | 9/1962 | Wurn | 280/5.2 |
| 3,079,168 | 2/1963 | Monroe et al. | 280/47.27 |
| 3,411,798 | 11/1968 | Capadalis | 280/5.2 |
| 4,046,391 | 9/1977 | Restad et al. . | |
| 4,290,618 | 9/1981 | Morton | 280/5.22 |
| 4,368,896 | 1/1983 | Ortega | 280/5.24 |
| 4,531,752 | 7/1985 | Diener | 280/5.22 |
| 4,570,935 | 2/1986 | Stefanini . | |
| 4,858,940 | 8/1989 | Cheng | 280/5.2 |
| 4,962,940 | 10/1990 | Cuschera . | |
| 5,277,439 | 1/1994 | Pipes et al. . | |

FOREIGN PATENT DOCUMENTS

| | | | |
|---|---|---|---|
| 0287857 | 10/1988 | European Pat. Off. | 280/5.2 |
| 2401814 | 2/1978 | France | 280/5.2 |
| 1071715 | 6/1967 | United Kingdom | 280/47.19 |

*Primary Examiner*—Daniel G. DePumpo
*Attorney, Agent, or Firm*—Fishman, Dionne, Cantor & Colburn

[57] ABSTRACT

A stair climbing hand truck utilizes two pairs of wheels which are attached to a secondary frame forming a part of the hand truck and which are mounted in an overlapping relationship. The first pair of wheels is mounted exteriorly of the secondary frame so as to lie outside of the hand truck's main frame structure, and the second pair of wheels is mounted interiorly of the main frame structure wherein all wheels are of the same diameter.

4 Claims, 4 Drawing Sheets

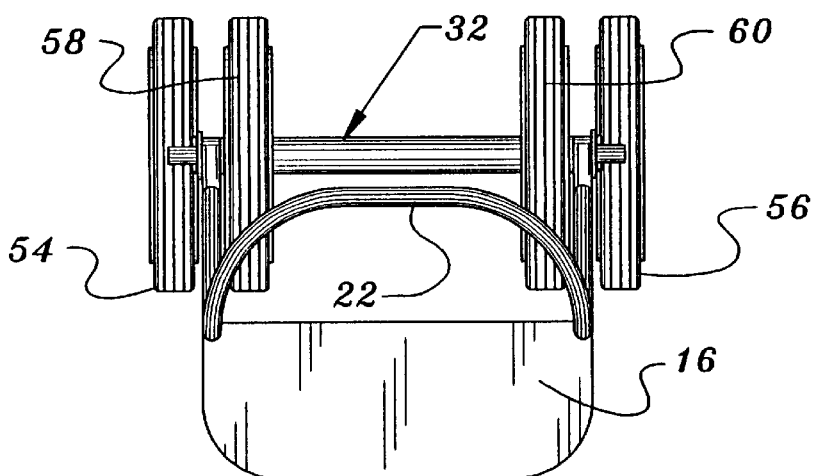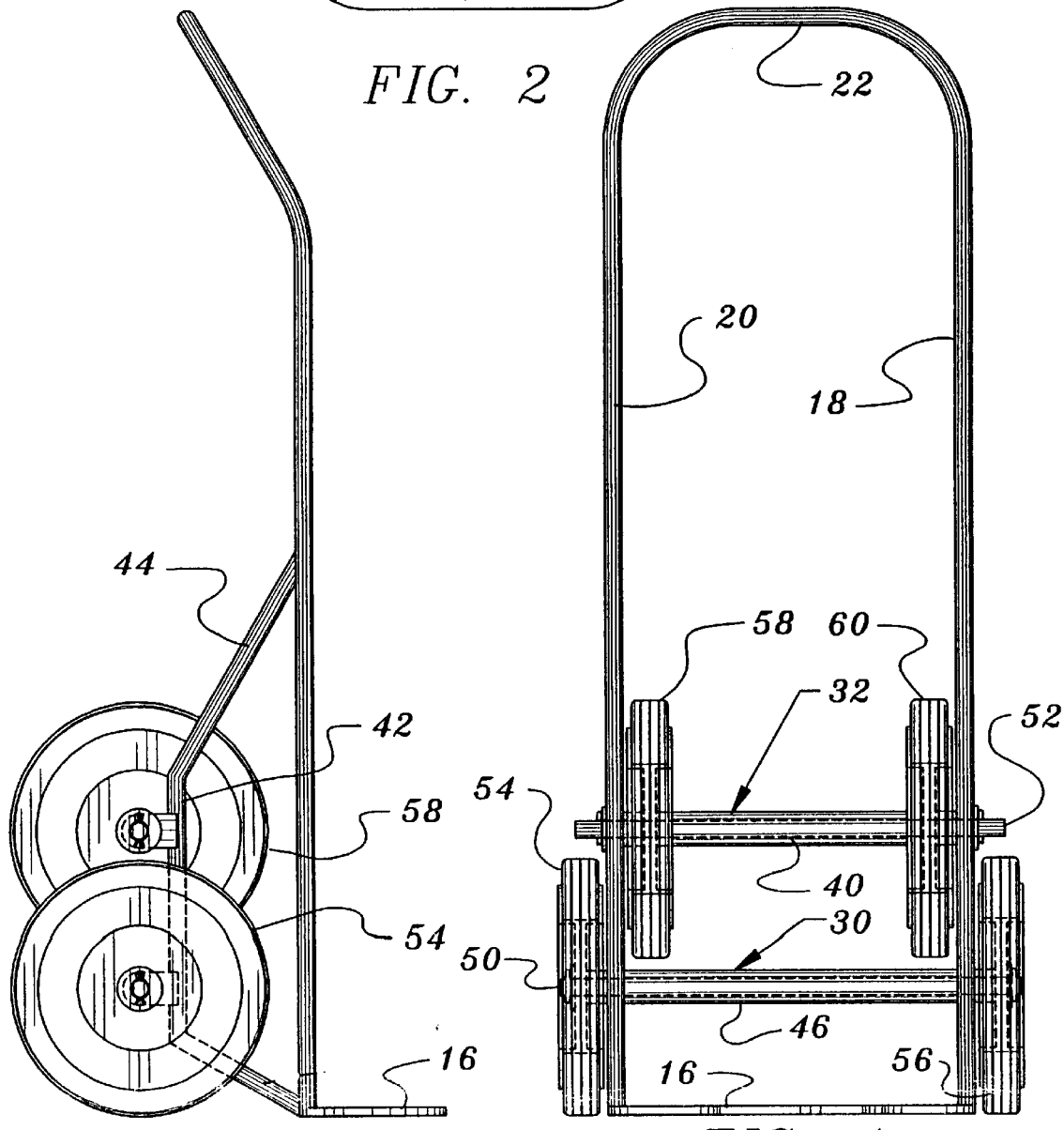

STAIR CLIMBING HAND TRUCK

BACKGROUND OF THE INVENTION

This invention relates generally to hand material moving trucks. More particularly, this invention relates to a new and improved hand truck which is particularly adapted for moving material up and down stairs (stair climbing).

Stair climbing hand trucks are well known in the prior art. In many instances, stair climbing hand trucks rely upon rail like members positioned behind a main set of wheels wherein such rail like members allow a hand truck to be pulled and/or slid over the edge of a stair step until wheel engagement on the next flat surface or stair occurs. Examples of this type of stair climbing hand trucks are to be found in U.S. Pat. No. 4,046,391 to Restad et al; U.S. Pat. No. 4,570,953 to McPeak et al; and U.S. Pat. No. 4,962,940 to Cuschera. Although an improvement over the previous prior art, these disclosed improvements still require an inordinate amount of effort by the person using the hand truck in that most of the weight of the load must be carried by that person at certain points of the travel up and/or down the stairs when the main wheels are not on a horizontal surface.

Of particular interest is U.S. Pat. No. 5,277,439 to Pipes et al. The hand truck depicted in the '439 patent utilizes a pair of primary wheels attached at the lower end of the frame for rolling the hand truck over a surface in a conventional manner with a pair of auxiliary wheel attached to a swing-away frame. The auxiliary wheels can be moved to a position in which the hand truck, with its load, rests in a stable position on all four wheels. While being functional for its intended purpose, these auxiliary wheels are of a much smaller diameter than the primary main shells. Additionally, the supporting structure for the auxiliary wheels is not as strong as the rigid structure provided for the primary main wheels. Accordingly, it appears that the bulk of the load, especially if the load is particularly heavy, must be centered over the primary main wheels to prevent collapse of the auxiliary wheel structure. There is no indication that these auxiliary wheels can be utilized to assist the hand truck in a use other than movement on a horizontal surface.

Thus, there is a perceived need for new and novel hand trucks which would use multiple pairs of wheels to assist in stair climbing, wherein such additional sets of wheels would be designed to handle the heaviest loads possible.

SUMMARY OF THE INVENTION

The above-discussed and other problems and deficiencies of the prior art are overcome or alleviated by the novel and improved stair climbing hand truck of the present invention. In accordance with the present invention, a stair climbing hand truck is provided which comprises the traditional three elements of a conventional hand truck such as a basic frame, load carrying shelf and a set of wheels, which in this case are mounted exteriorly at one end of a secondary frame. Thus this invention further comprises a secondary frame which is rigidly attached to the aforementioned basic frame, and upon which both a first set of exteriorly mounted wheels and a second set of interiorly mounted wheels are mounted (both sets of wheels being located interiorly or exteriorly in relation to the basic frame).

Importantly, the second set of wheels is located overlappingly above the first set of wheels. The wheels are sized so that at any time a portion of at least one each of a set of wheels is in constant contact with either a horizontal or vertical portion of a stair as the stair climbing hand truck is raised and/or lowered on a flight of stairs, thus allowing a smooth continuous motion with the least amount of effort possible being expended by the operator of this new improved stair climbing hand truck.

The above-discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several FIGSURES:

FIG. 2 is a top plan view of the stair climbing hand truck of FIG. 1;

FIG. 3 is a side elevation view of the stair climbing hand truck of FIG. 1;

FIG. 4 is a front elevation view of the stair climbing hand truck of FIG.1;

DESCRIPTION OF THE PREFERRED EMBODIMENT

Figure 1:
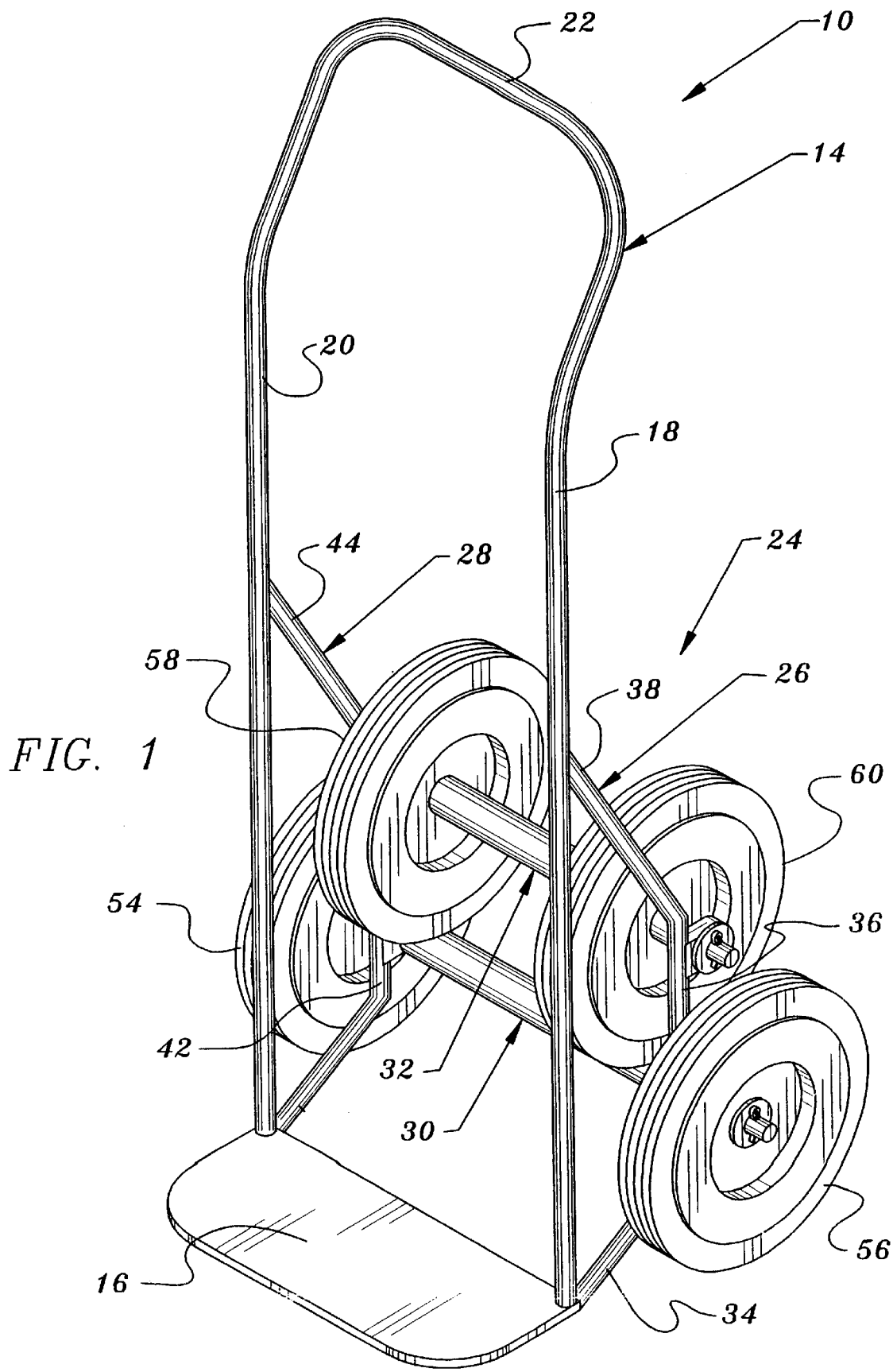
FIG. 1 is a perspective view of the stair climbing hand truck in accordance with the present invention.

Referring first to FIG. 1, the stair climbing hand truck of the present invention is shown generally at 10. Device 10 is comprised of the three traditional elements of a conventional hand truck such as a basic frame 14, a load carrying shelf or element 16 and a set of primary wheels and axle assembly 54, 56, 30 mounted exteriorly at the bottom of the hand truck basic frame 14. Attached to basic frame 14 on the left side in the bottom half of basic frame 14 is secondary frame 28. Also, attached to the right side of basic frame 14 (also in the bottom half of basic frame 14) is secondary frame 26. Both the primary set of wheels and axle assembly 54, 56, 30 and a secondary set of wheels and axle assembly 58, 60, 32 are mounted on the left side to the secondary frame 28 and the right side to secondary frame 26. The secondary set of wheels and axle assembly 58, 60, 32 are mounted interiorly to basic frame 14.

It is anticipated that basic frame 14 would be fabricated to standard dimensions known to the industry. It should also be noted at this point that if it is anticipated that a load to be carried on the basic frame 14 should be so narrow as to fall between uprights 18, 20 (such as an oxygen or other compressor gas cylinder or other narrow items), then, of course, suitable cross-bars (not shown) could be added with appropriate fastening hardware (not shown) so that the load would not bear on the wheels 58, 60 making wheels 58, 60 non-operable. As shown in FIG. 1, basic frame 14 is comprised of hand bar 22 and uprights 18 and 20 terminating in load carrying shelf 16 which will be described in detail hereinafter. Wheels 54, 56, 58, 60 are sized so that either one or both sets of wheels are always in contact with at least one vertical or horizontal surface of a stair or stairs.

Now turning to FIGS. 2–6 and including FIG. 1, discussion of the details of the present invention follows herewith.

As previously discussed, basic frame 14 comprises bend hand bar 22 (this bend allows clearance between the load and the hands of the operator) attached by known means to uprights 18, 20 which descend downwardly from bent hand bar 22 to be attached to load carrying shelf 16, also by known means. It should be noted that the known means for joining these items would preferably be by welding. Bend hand bar and uprights 18, 20, of course, could be formed from one piece of metal by known means.

Figures 5, 6:
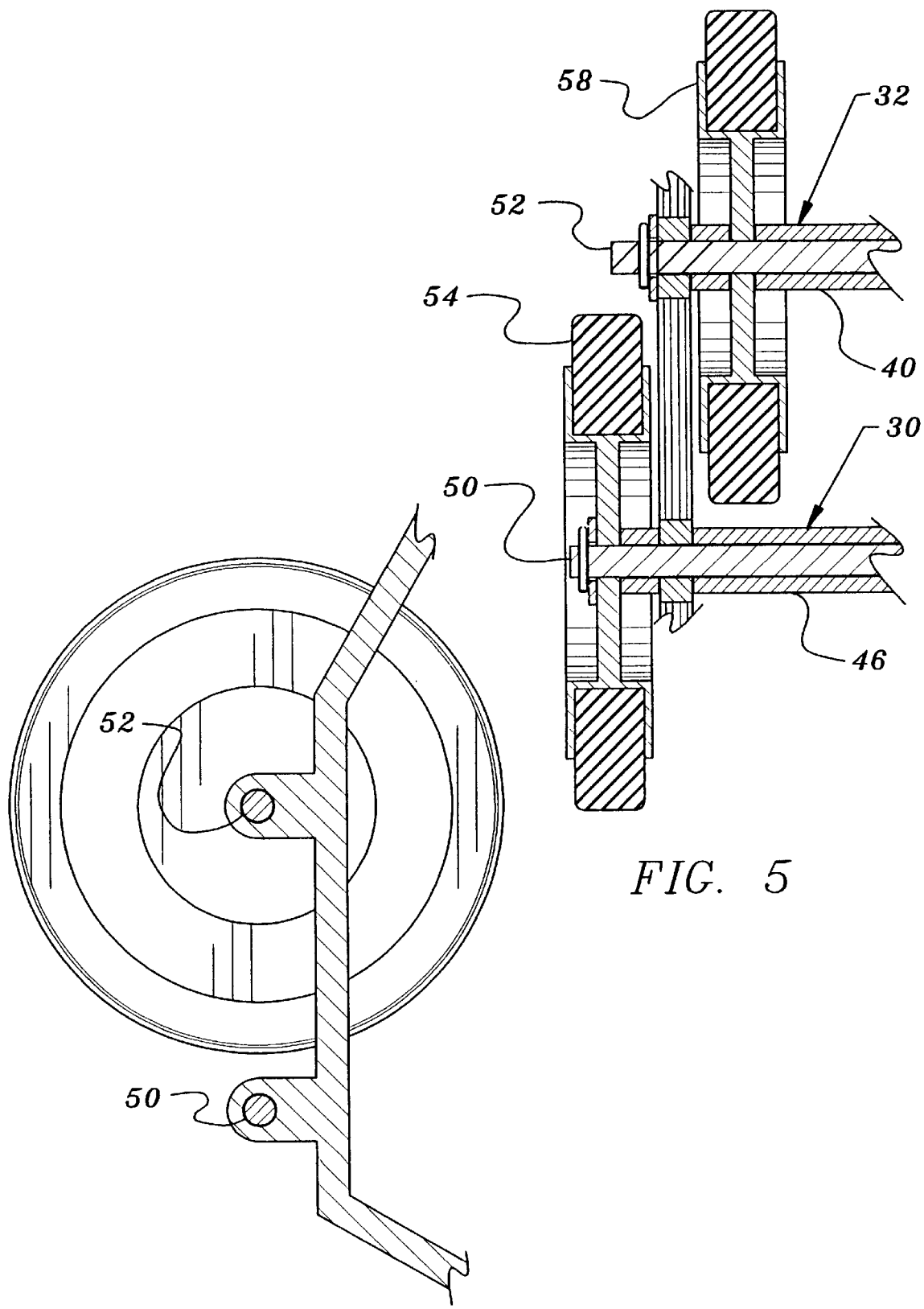
FIG. 5 is a partial cross-sectional view taken along the center line of the left side wheels of the stair climbing hand truck of FIG. 1.
FIG. 6 is a partial cross-sectional view taken along the center line of a portion of the secondary frame of the left side secondary frame of the stair climbing hand truck of FIG. 1.

Secondary frames 26 and 28 are identical so only secondary frame 26 will be described in detail. Secondary frame 26 is comprised of three segments, upper angular segment 38, parallel segment 36 and lower angular segment 34. The upper end of upper angular segment 38 joins upright 18 at about the midway point of upright 18 and is preferably joined to upright 18 by welding as in the case of basic frame 14 previously discussed. Upper angular segment 38 descends angularly downwardly far enough away from upright 18 so that the two sets of wheels 58, 60 and 54, 56 are behind the load plane formed by uprights 18, 20 and joins parallel segment 36, again, preferably by welding. Parallel segment 36 is parallel to upright 18. The lower end of parallel segment 36 is joined to lower angular segment 34 (again, preferably by welding). The bottom end of lower angular segment 34 is joined to the bottom end of upright 18 and load carrying shelf 16 (also, preferably by welding) to form a rigid, and extremely strong structure. Again, it should be noted both secondary frames 26, 28 could each be formed from one piece of metal by known methods as has been mentioned hereinbefore in reference to basic frame 14. Load carrying shelf 16 is fabricated from flat stock and of sufficient thickness to carry the anticipated load. It should be further noted that any structural shape such as round, square, rectangular or other suitable shape may be used as required. Additionally, steel is the preferred metal from a cost point of view, but should weight of the stair climbing hand truck be an overriding consideration, then structural aluminum should be considered. Attached to parallel segment 36 are two axle supporting struts (not numbered) best seen in FIG. 3 and FIG. 6. As seen in FIG. 6 (FIG. 6 is a partial cross-sectional view taken along the center line of left parallel segment 42), axle 50 for wheel 54 (wheel 54 not shown) and axle 52 for wheel 58 are retained in two axle bearing struts which maintain wheels 54, 58 in both parallel and overlapping relationship to one another. Wheels 60, 56 are similarly retained on the opposite ends of axles 50, 52 by identical axle bearing struts on the right side of stair climbing hand truck 10. The four axle bearing struts could alternatively be eliminated (and possible cost savings accrued) by simply making parallel segments 36, 42 wide enough to retain the four ends of axles 50, 52.

In FIG. 1, the two wheel and axle assemblies are generally shown at 24 as a whole. Wheel and axle assembly 24 is comprised of an interiorly mounted wheel and axle assembly generally shown at 32 and an exteriorly mounted wheel and axle assembly generally shown at 30.

Interiorly mounted wheel and axle assembly 32 is comprised on an inside axle element 52, an outer tubular member 40, two wheels 58, 60 and fastening hardware and/or spaces (not numbered).

Similarly, exteriorly mounted wheel and axle assembly 30 is comprised of an inside axle element 50, an out tubular member 46, two wheels 54, 56 and fastening hardware and/or spaces (not numbered).

Figure 2A:
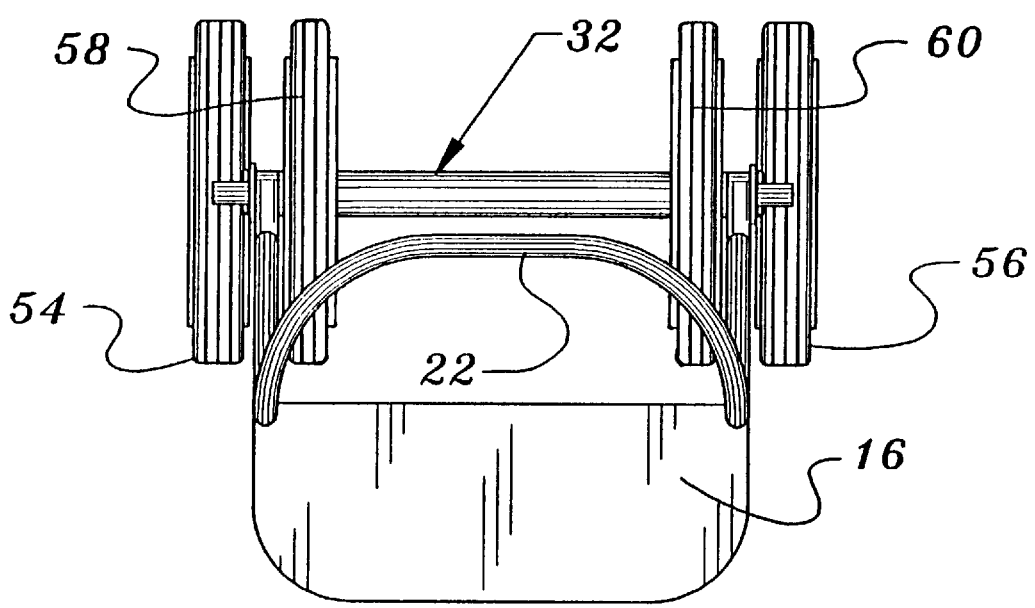
FIG. 2A is a top plan view of a second embodiment of the stair climbing hand truck of the present invention.

Wheels 54, 56, 58, 60 are commercially available and are known to the industry. Additionally, it is anticipated that these wheels will come supplied with brushings and/or bearings from the manufacturer or supplier and will be supplied with the necessary fastening hardware such as washers, spacers, cotter pins or nuts, etc. so that the wheels 54, 56, 58, 60 can be mounted on the inside axle elements 52, 50. Wheels 54, 56, 58, 60 are preferably of the same diameter, preferably 8" and are preferably semi-pneumatic plastic or rubber. FIG. 2A illustrates a second embodiment of the present invention, wherein the first pairs of wheels 54,54 has a first width and the second pair of wheels 58, 60 has a second width, wherein the first width and second width are different.

Inside axle element 52 and inside axle element 50 are of the same diameter. Similarly, outer tubular member 40 and outer tubular member 46 are of the same ID and ODs.

The length of inside axle element 52 and the length of outer tubular member 40 are sized to fit in between secondary frame 26 and secondary frame 28.

The length of inside axle element 50 and the length of outer tubular member 46 are sized to extend to the outside of secondary frame 26 and to the outside of secondary frame 28.

Alternatively, inside axle element 52 and outer tubular member 40 could be fabricated from a single piece and/or inside axle element 52 need not extend through the entire length of outer tubular member 40. Similarly, inside element 50 and outer tubular member 46 could be fabricated from a single piece and/or inside axle element 50 need not extend through the entire length of outer tubular member 46.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A stair climbing hand truck particularly adapted for climbing stairs, said stair climbing hand truck comprising:

a main frame having a front side and a rear side, the main frame capable of supporting a load resting thereon, said main frame consisting of at least two load supporting uprights, a load supporting shelf at one end of said uprights projecting toward said front side and at the other end of said uprights an operator handle joining the at least two uprights, said handle being inclined toward said rear of said frame;

said frame further having an outside area defined by said uprights and said handle;

a secondary frame integrally connected to said rear side of said main frame, said secondary frame supporting a pair of first wheels and axle assembly, said first pair of wheels being proximate said load supporting shelf;

said secondary frame also supporting a pair of second wheels and axle assembly disposed between said first pair of wheels and said operator handle;

said first pair of wheels are of the same diameter as those of said second pair of wheels;

said first pair of wheels disposed in said outside area;

said second pair of wheels and axle assembly disposed between said secondary frame; and said first pair of wheels are in overlapping relationship with said second pair of wheels and said first and second pairs of wheels are coupled to said secondary frame in a plane which extends upwardly and is substantially parallel with said at least two load supporting uprights of said main frame.

2. The stair climbing hand truck of claim 1 wherein the said axle of the said first pair of wheels an the said axle of the said second pair of wheels are parallel.

3. The said wheels of claim 1 wherein said first pair of wheels has a first width and said second pair of wheels has a second width, wherein said first width and said second width are different.

4. The stair climbing hand truck of claim 1, wherein said secondary frame comprises;

- a pair of upper angular segments, each upper angular segment having a top end and a bottom end;
- a pair of parallel segments, each parallel segment having a first end and a second end;
- a pair of lower angular segments, each lower angular segment having a top end and a bottom end;
- said pair of upper angular segments is coupled to said load supporting uprights at said top end of said upper angular segments and is coupled to said first end of said parallel segments at said bottom end of said upper angular segments;
- said pair of lower angular segments is coupled to said load supporting uprights at said bottom end of said lower angular segments and is coupled to said second end of said parallel segments at said top end of said lower angular segments, said bottom end of said lower angular segments proximate said load supporting shelf; and
- wherein said pair of parallel segments is parallel said at least two load supporting uprights of said main frame, said parallel segments supporting said pair of first wheels and axle assembly and said pair of second wheels and axle assembly.

* * * * *

UNITED STATES PATENT AND TRADEMARK OFFICE
CERTIFICATE OF CORRECTION

PATENT NO. : 5,833,249
DATED : November 10, 1998
INVENTOR(S) : Dominick DeMartino It is certified that error appears in the above-identified patent and that said Letters Patent is hereby corrected as shown below:

In Column 1, Line 34, delete "shells" and insert therefor --wheels--
In Column 3, Line 58, delete "on" and insert therefor --of--
In Column 3, Line 62, delete "out" and insert therefor --outer--
In Column 4, Line 10, delete "54, 54" and insert therefor --54, 56--
In Column 5, Line 2, delete "an" and insert therefor --and--

Signed and Sealed this

Ninth Day of January, 2001

Attest:

Q. TODD DICKINSON

*Attesting Officer*   *Commissioner of Patents and Trademarks*